United States Patent
Gallant et al.

(10) Patent No.: US 8,700,716 B2
(45) Date of Patent: *Apr. 15, 2014

(54) SYSTEMS AND METHODS FOR INITIATING ANNOUNCEMENTS IN A SIP TELECOMMUNICATIONS NETWORK

(75) Inventors: John Kenneth Gallant, Plano, TX (US); Kathleen A McMurry, Richardson, TX (US); Mariafranca Gregorat, Dallas, TX (US)

(73) Assignee: Tekla Pehr LLC, Dover, DE (US)

( * ) Notice: Subject to any disclaimer, the term of this patent is extended or adjusted under 35 U.S.C. 154(b) by 365 days.

This patent is subject to a terminal disclaimer.

(21) Appl. No.: 12/850,444

(22) Filed: Aug. 4, 2010

(65) Prior Publication Data

US 2011/0032928 A1 Feb. 10, 2011

Related U.S. Application Data

(63) Continuation of application No. 10/234,538, filed on Sep. 4, 2002, now Pat. No. 7,792,973.

(60) Provisional application No. 60/363,592, filed on Mar. 12, 2002.

(51) Int. Cl.
*G06F 15/16* (2006.01)

(52) U.S. Cl.
USPC ........... 709/206; 709/203; 709/217; 709/223; 709/227; 379/88.17; 379/142.06

(58) Field of Classification Search
USPC ................. 709/227–230, 203, 206, 217, 223; 379/88.17, 88.18, 201.02, 211.02, 379/142.01, 142.06
See application file for complete search history.

(56) References Cited

U.S. PATENT DOCUMENTS

| | | | |
|---|---|---|---|
| 5,579,379 | A | 11/1996 | D'Amico et al. |
| 5,737,393 | A | 4/1998 | Wolf |
| 5,867,495 | A | 2/1999 | Elliott et al. |
| 6,047,051 | A | 4/2000 | Ginzboorg et al. |
| 6,047,054 | A | 4/2000 | Bayless et al. |
| 6,047,268 | A | 4/2000 | Bartoli et al. |
| 6,282,193 | B1 | 8/2001 | Hluchyj et al. |
| 6,311,164 | B1 | 10/2001 | Ogden |

(Continued)

FOREIGN PATENT DOCUMENTS

| | | |
|---|---|---|
| EP | 1324544 | 7/2003 |
| WO | 03/079622 | 9/2003 |

OTHER PUBLICATIONS

Lennox et al., "Call Processing Language (CPL)", Oct. 2004, Network Working Group, RFC 3880.

(Continued)

*Primary Examiner* — Ramy M Osman
(74) *Attorney, Agent, or Firm* — Fitch, Even, Tabin & Flannery LLP

(57) ABSTRACT

Network servers in a session initiation protocol (SIP) telecommunication network implement playback of announcements to end-users by embedding programming scripts defining how the announcements are to be played in a SIP message. In particular, the scripts may define the sequence in which a series of announcements are to be played, duration information relating to a playback length of the announcements, and repetition information defining how many times an announcement is to be repeated. By including a script in a single message, announcement instructions may be efficiently communicated in the network.

63 Claims, 10 Drawing Sheets

(56) References Cited

U.S. PATENT DOCUMENTS

| | | | |
|---|---|---|---|
| 6,587,556 | B1 | 7/2003 | Judkins et al. |
| 6,614,781 | B1 | 9/2003 | Elliott et al. |
| 6,654,447 | B1 * | 11/2003 | Dewan ............................ 379/76 |
| 6,665,723 | B2 | 12/2003 | Trossen |
| 6,701,366 | B1 * | 3/2004 | Kallas et al. ................... 709/227 |
| 6,704,396 | B2 | 3/2004 | Parolkar et al. |
| 6,751,652 | B1 | 6/2004 | Thomas |
| 6,778,653 | B1 * | 8/2004 | Kallas et al. ............. 379/201.02 |
| 6,931,007 | B2 | 8/2005 | Jones |
| 6,937,563 | B2 | 8/2005 | Preston et al. |
| 6,937,597 | B1 | 8/2005 | Rosenberg et al. |
| 6,987,765 | B2 | 1/2006 | March et al. |
| 7,044,741 | B2 * | 5/2006 | Leem ............................ 434/156 |
| 7,054,945 | B2 | 5/2006 | Hurtta et al. |
| 7,076,032 | B1 | 7/2006 | Pirasteh et al. |
| 7,092,385 | B2 | 8/2006 | Gallant et al. |
| 7,203,293 | B1 * | 4/2007 | Bedingfield ............. 379/142.01 |
| 7,257,201 | B2 | 8/2007 | Singh et al. |
| 7,304,984 | B2 * | 12/2007 | Butler et al. ............. 379/211.02 |
| 7,433,954 | B2 | 10/2008 | Dolinar et al. |
| 7,526,076 | B2 * | 4/2009 | Koch ....................... 379/142.06 |
| 7,640,510 | B2 * | 12/2009 | Sirstins et al. ................ 715/765 |
| 7,739,196 | B2 | 6/2010 | Gallant et al. |
| 7,792,973 | B2 * | 9/2010 | Gallant et al. ................ 709/228 |
| 7,860,800 | B2 | 12/2010 | Gallant et al. |
| 8,126,125 | B2 * | 2/2012 | Koch ....................... 379/142.06 |
| 8,255,463 | B2 * | 8/2012 | Peters et al. ................... 709/217 |
| 8,438,494 | B2 * | 5/2013 | Sirstins et al. ................ 715/765 |
| 2001/0023416 | A1 | 9/2001 | Hosokawa |
| 2002/0120729 | A1 | 8/2002 | Faccin et al. |
| 2002/0146005 | A1 | 10/2002 | Gallant et al. |
| 2002/0169776 | A1 | 11/2002 | Tuunanen et al. |
| 2003/0051037 | A1 | 3/2003 | Sundaram et al. |
| 2004/0114744 | A1 | 6/2004 | Trossen |
| 2004/0148332 | A1 | 7/2004 | Parolkar et al. |

OTHER PUBLICATIONS

Campbell et al., RFC: 3087 "Control of Service Context Using SIP Request URI", Network Working Group, Apr. 2001.

International Search Report, PCT/US03/07374; Worldcom, Inc.; Jul. 15, 2003; 1 Page.

International Preliminary Examination Report; PCT/US03/07374; Worldcom, Inc.; Oct. 30, 2003; 3 Pages.

SIP ascendant: A year ago, we said SIP would win the "protocol wars." Today, however, SIP's biggest challenge comes not from rival protocols, but from a timid market's hesitation to explore the stunning new application paradigms that it enables, (Michael, Bill, Communications Convergence, v 9, n 6 , p. 28(22), Jun. 2001, ISSN: 1534-2840, 26 pages.

Rfc2753, A Framework for Policy-based Admission Control, 20 pages, IETF.

Draft-ietf-sip-refer-02, The SIP refer method, 19 pages, Internet Engineering Task Force, Oct. 30, 2001.

Draft -dcsgroup-sip-proxy-proxy-00., SIP proxy-to-proxy extensions for supporting Distributed Call State, 12 pages, Internet Engineering Task Force, Nov. 1999.

Draft-pan-diameter-sip-O 1.txt, Diameter: Policy and Accounting Extension for SIP, 25 pages, Internet Engineering Task Force, Nov. 15, 1998.

Draft-ietf-sip-rfc2543bis-04_txt, SIP: Session Initiation Protocol, 211 pages, Internet Engineering Task Force, Jul. 20, 2001.

\* cited by examiner

600 —

601 — filler.wav duration=10,
602 — still_trying.wav;
603 — repeat=forever;

Fig. 6

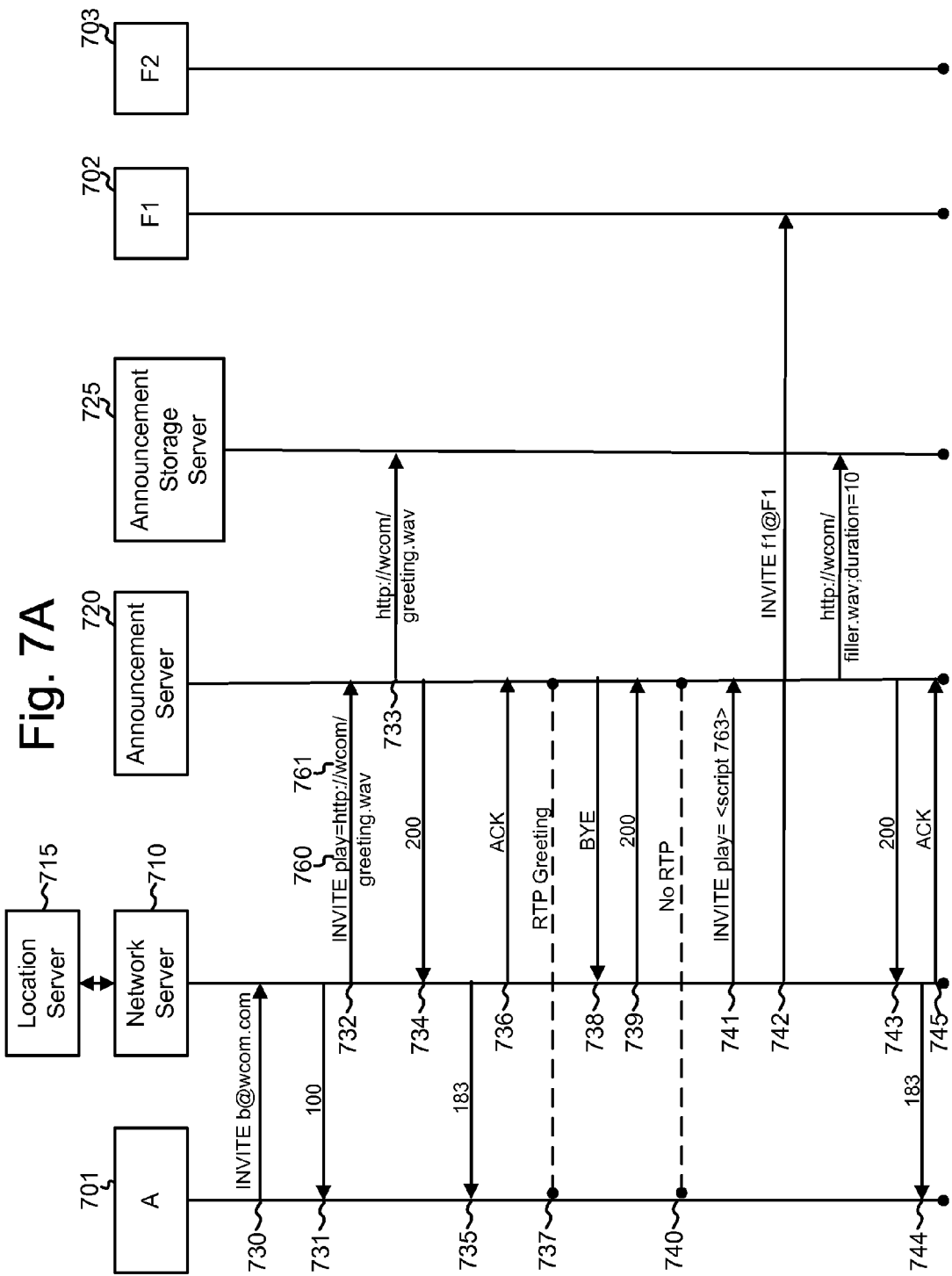

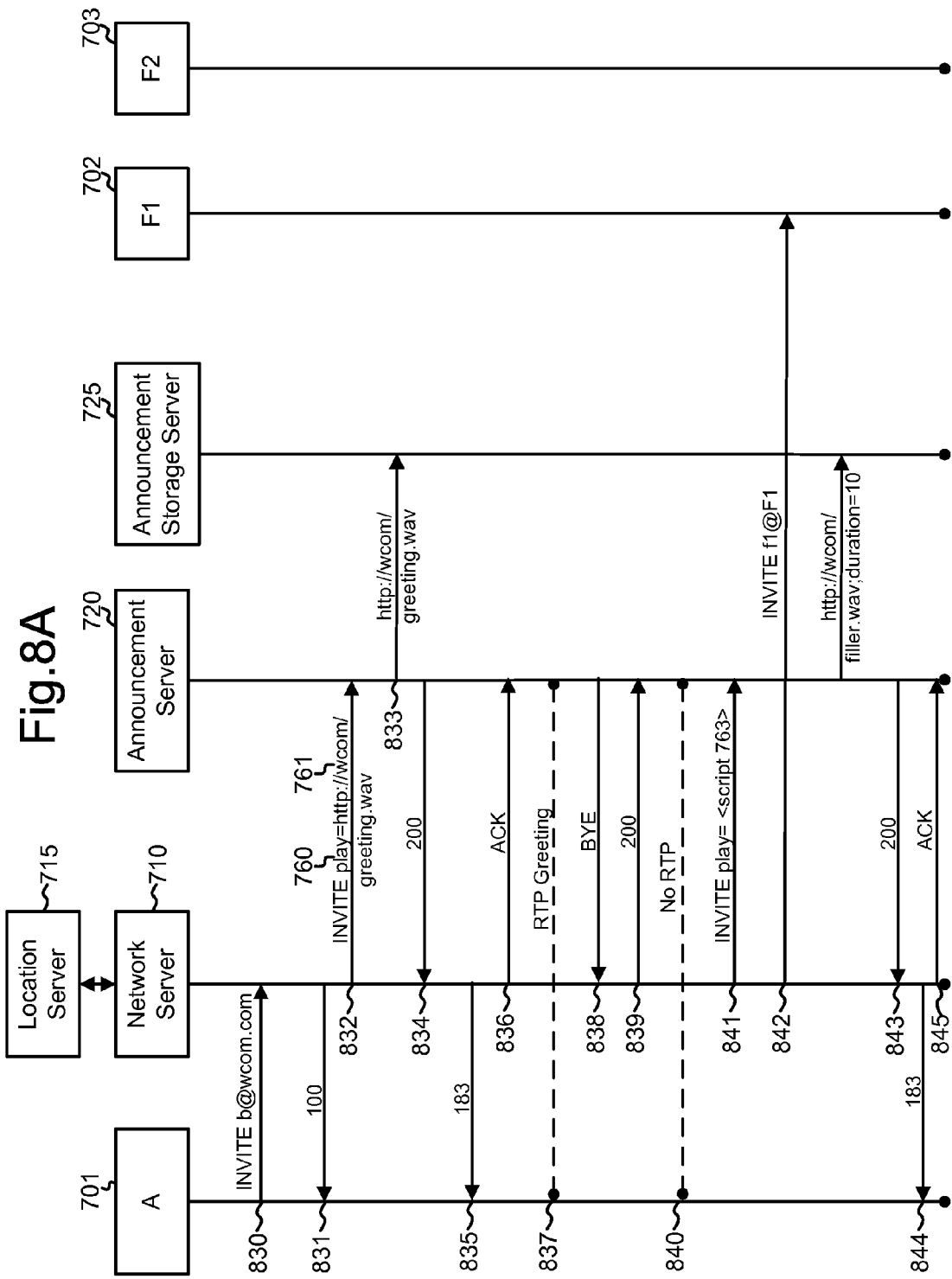

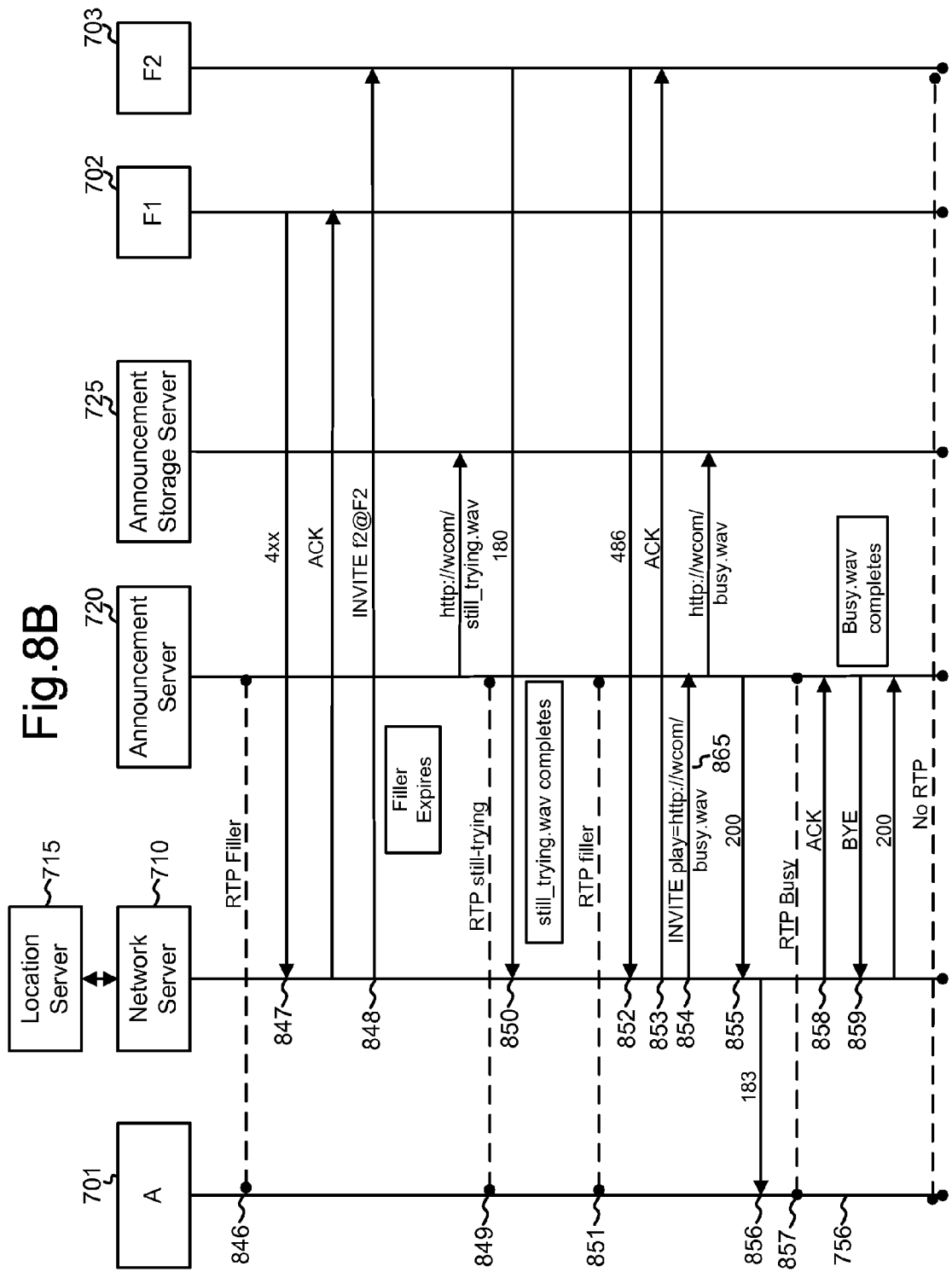

SYSTEMS AND METHODS FOR INITIATING ANNOUNCEMENTS IN A SIP TELECOMMUNICATIONS NETWORK

RELATED APPLICATIONS

This application is a continuation of U.S. patent application Ser. No. 10/234,538, filed Sep. 4, 2002, which claims priority under 35 U.S.C. §119 based on U.S. Provisional Application No. 60/363,592, filed Mar. 12, 2002, the disclosures of which are incorporated herein by reference.

BACKGROUND OF THE INVENTION

A. Field of the Invention

The present invention relates generally to voice over packet based networks, and more particularly, to SIP communication networks.

B. Description of Related Art

The transmission of voice and video over packet based networks, as compared to traditional dedicated-line telephone service, provides the possibility of significantly cheaper and more flexible voice and video connectivity.

SIP (session initiation protocol) is a signaling protocol for initiating, managing and terminating voice and video sessions across packet networks. SIP sessions involve one or more participants and can use unicast or multicast communication. Borrowing from ubiquitous Internet protocols, such as HTTP and SMTP, SIP is text-encoded and highly extensible. SIP may be extended to accommodate features and services such as call control services, mobility, and interoperability with existing telephony systems.

At certain times, telecommunication providers may wish to connect a calling party to a prerecorded announcement. For example, if the calling party dialed an invalid number, the telecommunication provider may wish to connect the party to an announcement that informs the party that the number is not recognized. Under the conventional SIP protocol, there is no provision for the effective playback of a such announcements.

Some solutions do exist for providing prerecorded announcements via the SIP protocol. These solutions tend to use one or more SIP messages for each pre-recorded announcement, or portion of the pre-recorded announcement. These solutions can be become quite message intensive, and are thus inefficient in handling announcements through SIP.

Accordingly, there is a need in the art to improve announcement playback in a SIP telecommunications network.

SUMMARY OF THE INVENTION

Systems and methods consistent with the principles of this invention provide for an efficient and flexible messaging scheme in a SIP network for playback of pre-recorded announcements.

One aspect of the invention is directed to a method that includes receiving a first message from a user that initiates a call in a packet-based network and transmitting a second message to an announcement server in the network. The second message includes a script file that defines a sequence for announcements that are to be transmitted to the user.

A second aspect of the invention is directed to a network server in a packet-based network. The network server includes a processor and a memory containing program instructions. The program instructions are configured to receive a first SIP message relating to a call in the network and to transmit a second SIP message to an announcement server in the network. The second message includes an indication of at least one pre-recorded announcement to playback and control information relating to the playback of the at least one pre-recorded announcement.

A third aspect of the invention is directed to a method in a SIP network that includes receiving a SIP message that includes a script file that defines a playback sequence for announcements that are to be played to a user. The method further includes analyzing the script file to determine at least one of sequence information and duration information for the announcements defined by the script file and accessing resources corresponding to storage locations for the announcements. Still further, the method includes transmitting the announcements to the user in a real-time communication session based on the sequence information and the duration information.

A fourth aspect of the invention is directed to a system that includes a network server and an announcement server. The network server is configured to transmit a message to the announcement server. The message includes a script file that defines a playback sequence for announcements that are to be played to a user. The announcement server, based on the script file, accesses resources corresponding to storage locations for the announcements and transmits the announcements to an end-user in an announcement order defined by the script file.

BRIEF DESCRIPTION OF THE DRAWINGS

The accompanying drawings, which are incorporated in and constitute a part of this specification, illustrate the invention and, together with the description, explain the invention. In the drawings.

FIG. 6 is a diagram illustrating an exemplary script in a SIP message;

FIGS. 7A and 7B are call flow diagrams illustrating an exemplary successful call setup that includes announcement messages played to a user in a manner consistent with aspects of the present invention; and FIGS. 8A and 8B are call flow diagrams illustrating an exemplary failed call setup that includes announcement messages played to a user in a manner consistent with aspects of the present invention.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim features.

As described below, a call controller provides sophisticated announcement playback in a SIP telecommunications network. In particular, a SIP call controller transmits announcement playback instructions to an announcement server by embedding a script file in a SIP message. The script file provides instructions that can define complex announcement playback sequences within a single SIP message.

System Overview

Figure 1:
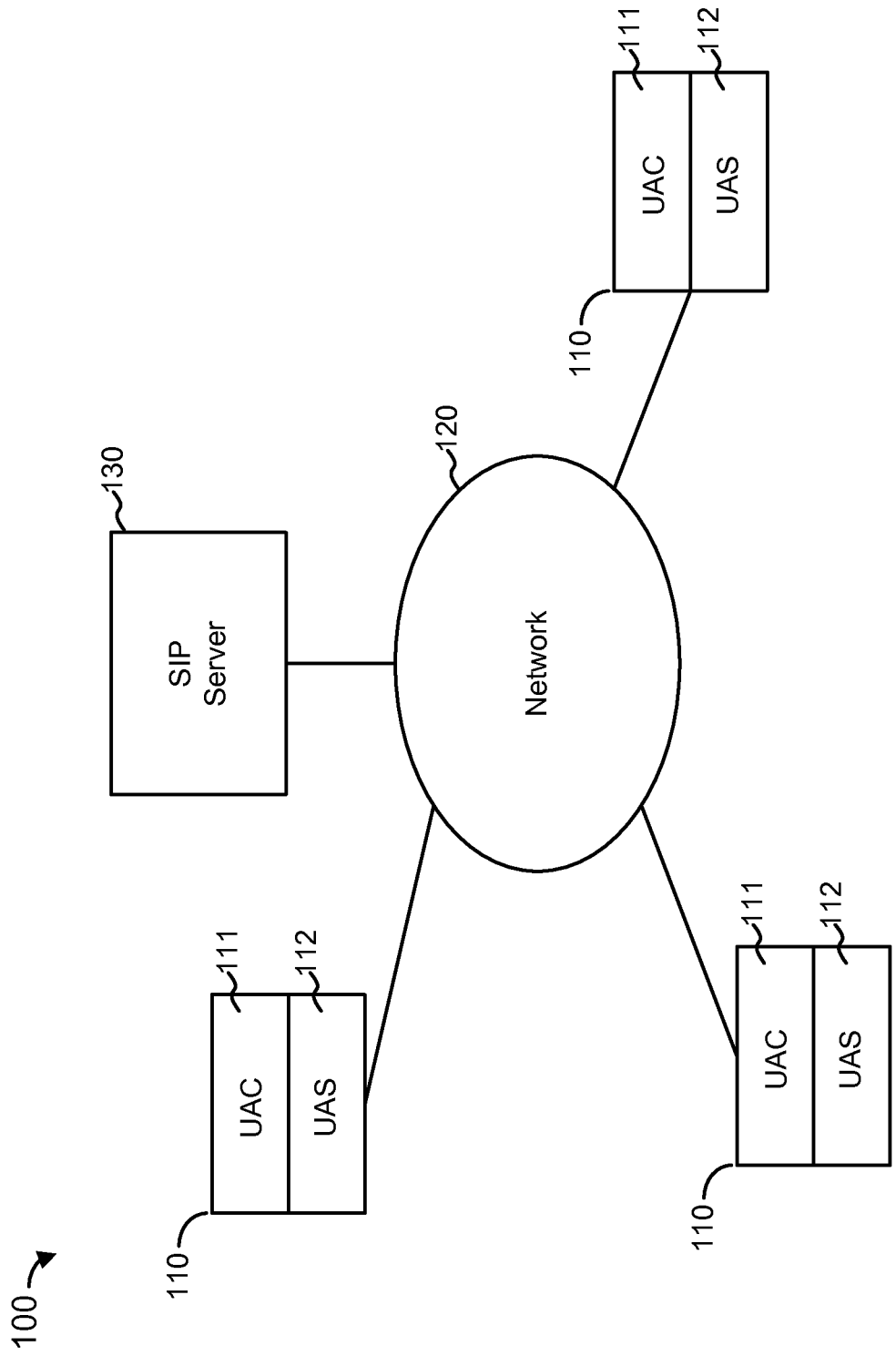
FIG. 1 is a diagram illustrating an exemplary system in which concepts consistent with the invention may be implemented.

FIG. 1 is a diagram illustrating an exemplary system 100 in which concepts consistent with the present invention may be implemented. System 100 may form a telecommunications network designed to carry voice and video data based on the SIP protocol.

System 100 includes a number of end-user stations 110. Communication sessions are performed between two or more end-user stations 110. End-user stations 110, generally at the requests of users of these stations, initiate and terminate sessions by exchanging requests and responses. Under the SIP protocol, end-user stations 110 are referred to as user agents, which may include both a user agent client (UAC) 111 and a user agent server (UAS) 112. UAC 111 may be a client application that initiates SIP requests. UAS 112 may be a server application that contacts the user when a SIP request is received and that returns a response on behalf of the user. Each of end-user stations 110 may be one of a number of different physical devices, including workstations, IP-phones, telephony gateways, call agents, and automated answering services.

SIP server 130 facilitates communications between end-user stations 110. SIP server 130 may act as a number of logical entities that perform separate SIP functions. Specifically, under the SIP protocol, SIP server 130 may act as a Proxy Server, a Redirect Server, or a Registrar. Although shown in FIG. 1 as a single SIP server 130, in some implementations, SIP server 130 may be implemented as a number of different computing devices, with potentially different computing device(s) handling each of the functions of Proxy Server, Redirect Server, and Registrar.

A Proxy Server is an intermediary entity that acts as both a server and a client for the purpose of making requests on behalf of other clients. Requests are serviced either internally or by passing them on, possibly after translation, to other servers. A Proxy Server may interpret, and if necessary, rewrite a request message before forwarding it.

A Redirect Server is a server that accepts a SIP request, maps the SIP address of the called party into zero or more new addresses and returns them to the client. Unlike Proxy Servers, Redirect Servers do not pass the request on to other servers.

A Registrar is a server that accepts SIP "register" requests for the purpose of updating a location database with the contact information of the user specified in the request.

Network 120 may include any type of packet network, such as a local area network (LAN), a wide area network (WAN), a virtual private network (VPN), an intranet, the Internet, or a combination of networks. End-user stations 110 and SIP server 130 may connect to network 120 via wired, wireless, and/or optical connections.

Figure 2:
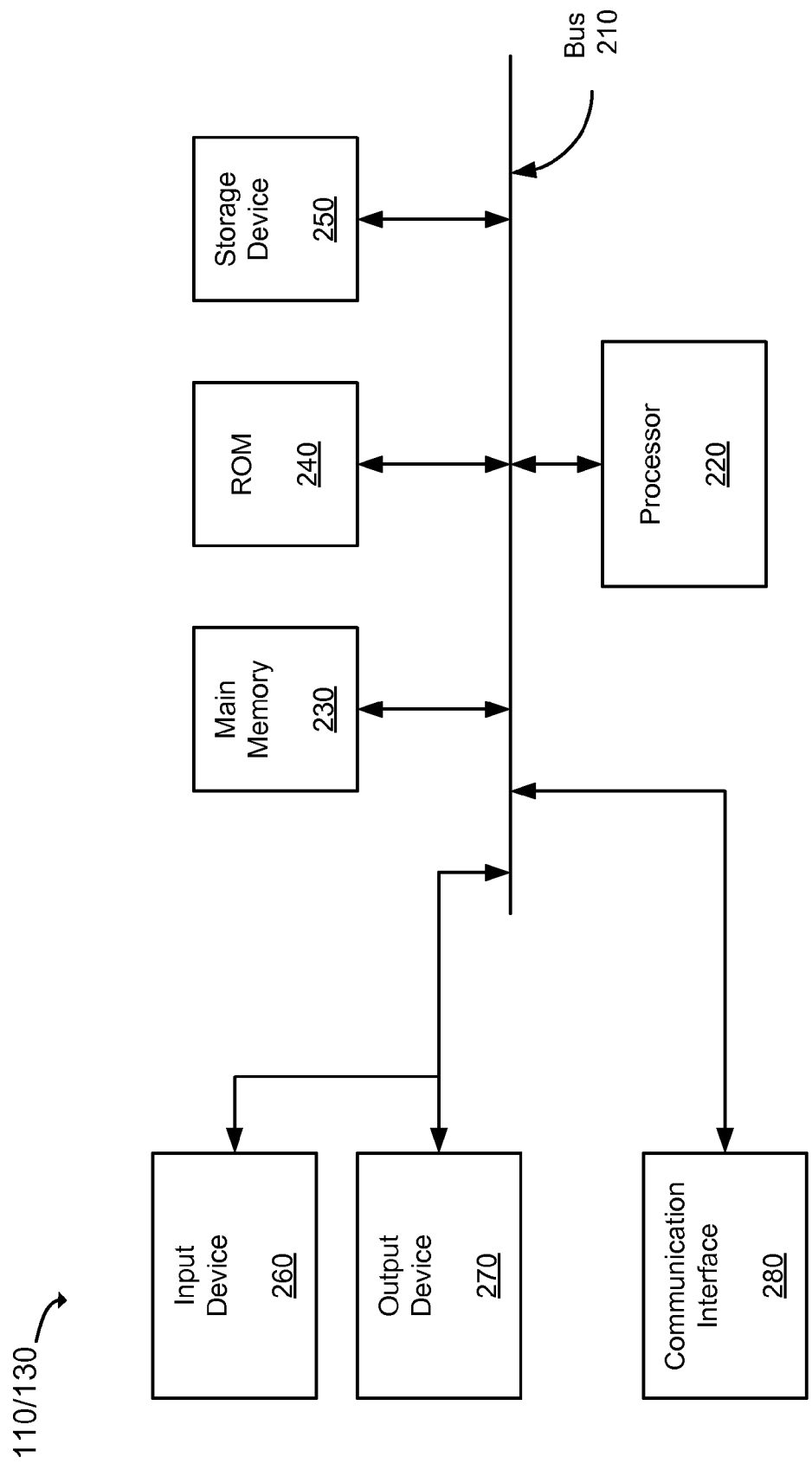
FIG. 2 is a diagram of an exemplary computing device shown in FIG. 1.

FIG. 2 is a diagram of an exemplary computing device that may correspond to one of end-user stations 110 or SIP server 130. Computing device 110/130 may include bus 210, processor 220, main memory 230, read only memory (ROM) 240, storage device 250, input device 260, output device 270, and communication interface 280. Bus 210 permits communication among the components of computing device 110/130.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit an operator to input information to computing device 110/130, such as a keyboard, a mouse, a pen, a number pad, a microphone and/or biometric mechanisms, etc. Output device 270 may include one or more conventional mechanisms that output information to the operator, including a display, a printer, speakers, etc. Communication interface 280 may include any transceiver-like mechanism that enables computing device 110/130 to communicate with other devices and/or systems. For example, communication interface 280 may include mechanisms for communicating with another device or system via a network, such as network 120.

SIP Signaling

Figure 3:
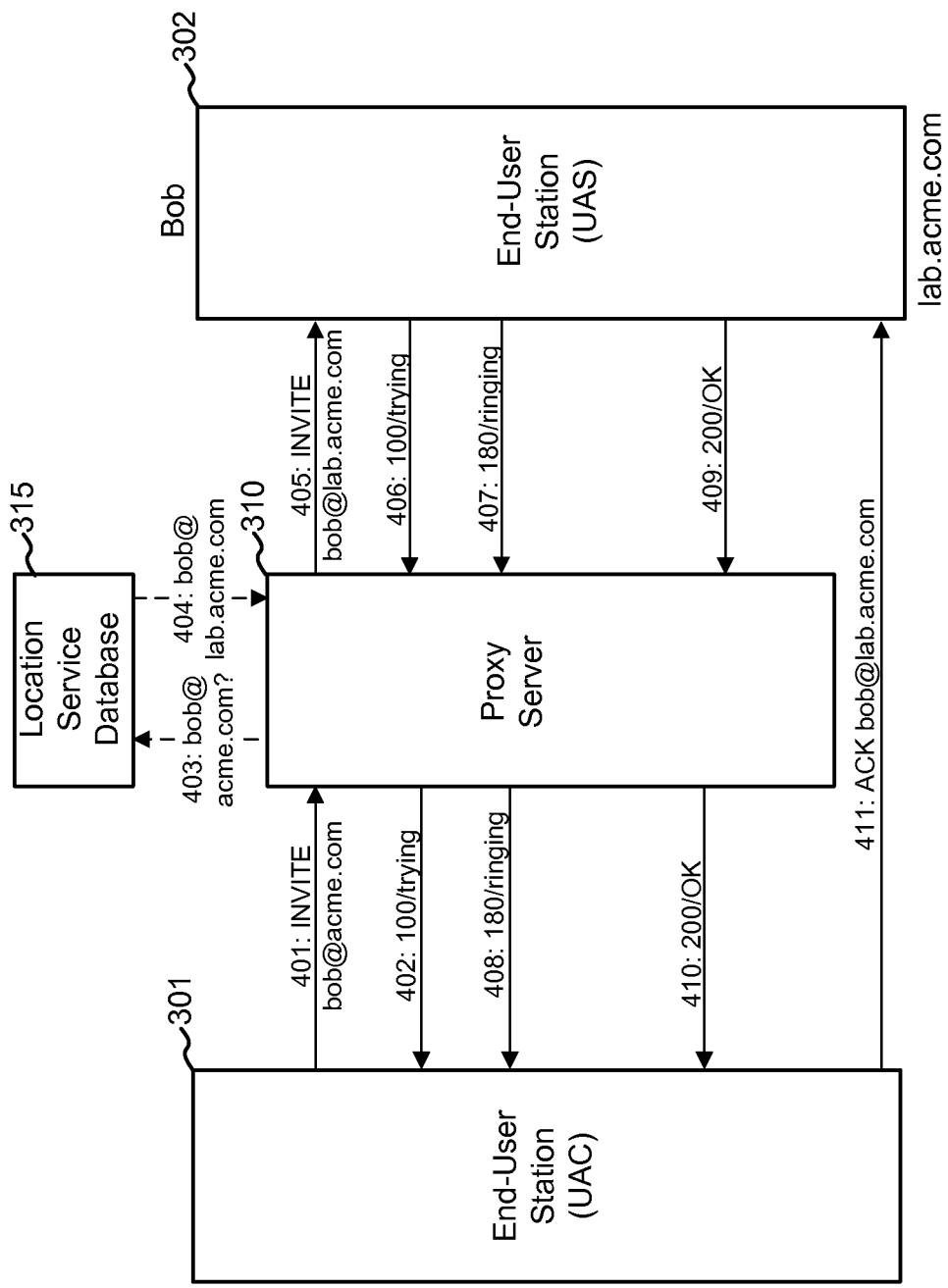
FIG. 3 is a diagram illustrating an exemplary call set-up between two end-user stations with the assistance of a proxy server.
Figure 4:
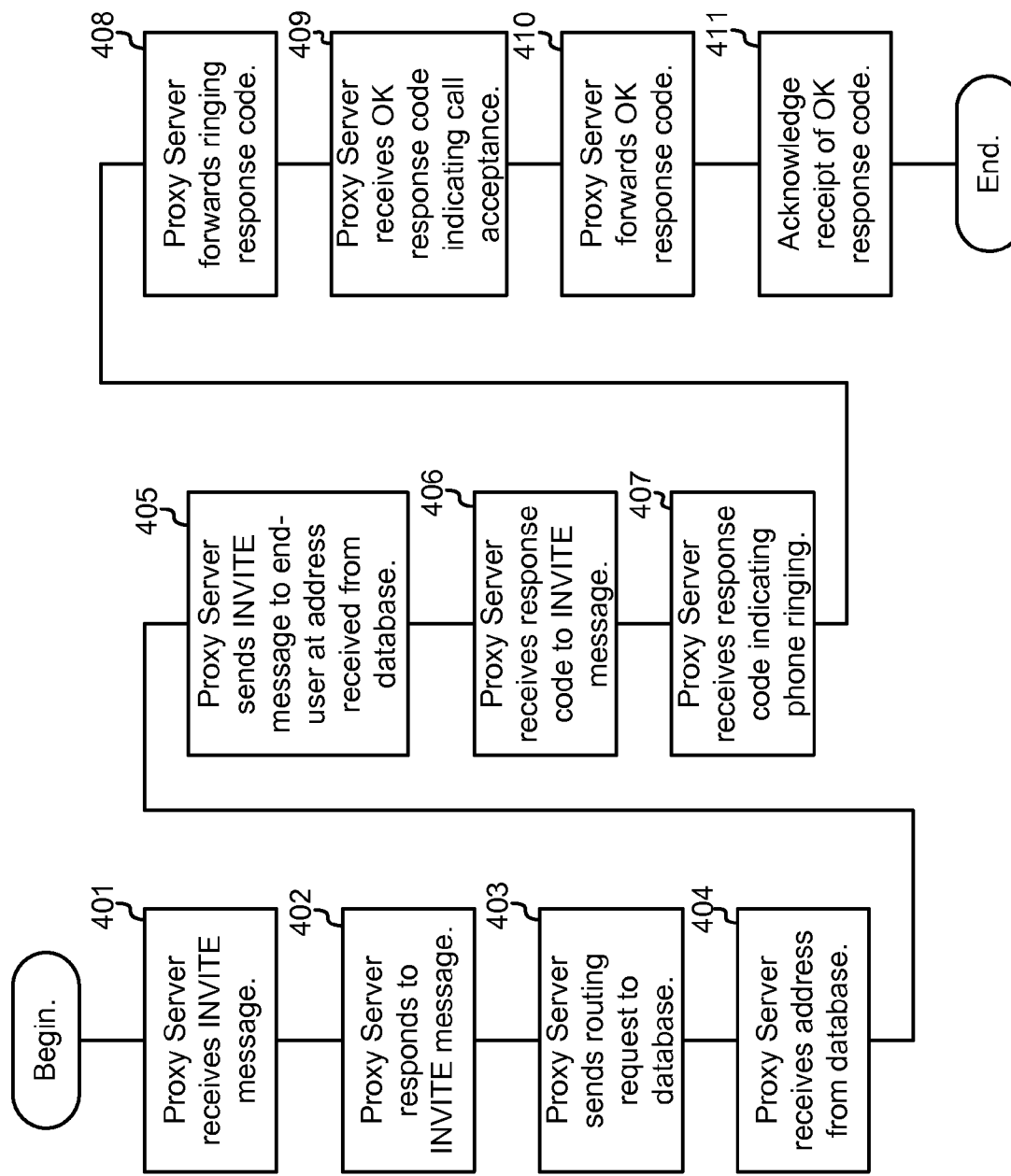
FIG. 4 is a flow chart illustrating the call set-up of FIG. 3.

FIG. 3 is a diagram illustrating an exemplary call set-up between two end-user stations 301 and 302 with the assistance of a network server, such as a SIP proxy server 310. It should be understood that end-user stations 301 and 302 may correspond to any of the end-user stations 110 shown in FIG. 1. Similarly, proxy server 310 may be implemented on SIP server 130 in FIG. 1. Location service database 315 may be a database or a server connected to a database that returns a user's current address or contact information in response to a request relating to the user. FIG. 4 is a corresponding flow chart illustrating the call set-up. In this example, a user at end-user station 301 invites "Bob" at end-user station 302 to join a telephone call.

The user at station 301 begins by sending an "INVITE" message, through proxy server 310, to the address at which Bob resides. Proxy server 310 responds with the SIP response code "100," which indicates that the proxy server 310 is trying to locate Bob (Act 402). Proxy server 310 may look up Bob's current location in location service database 315 via a routing request (Act 403). The routing request between proxy server 310 and location service database 315 may be implemented using a non-SIP protocol. Location service database 315 returns Bob's current address to proxy server 310 (Act 404). Locations service database may be a conventional database located either locally or remotely to proxy server 310.

The proxy server 310 sends a new INVITE message to end-user station 302, whose address was identified by the location service database 315 (Act 405). The user agent server of end-user station 302 responds with response code 100 (trying), (Act 406), and then with a response code 180, (Act 407), which indicates Bob's phone is ringing. Proxy server 310 may forward ringing response code 180 back to end-user station 301 (Act 408). When the call is accepted by Bob, end-user station 302 sends a response code 200 (OK) (Act 409). Proxy server 310 forwards the OK response code to end-user station 301 (Act 410). The OK response code may include Bob's correct IP address. End-user station 301 may then send an acknowledge (ACK) message to end-user station 302 (Act 411). Additional data sent during the communication session may then be directly transferred between user-stations 301 and 302.

Pre-Recorded Announcements in SIP

Figure 5:
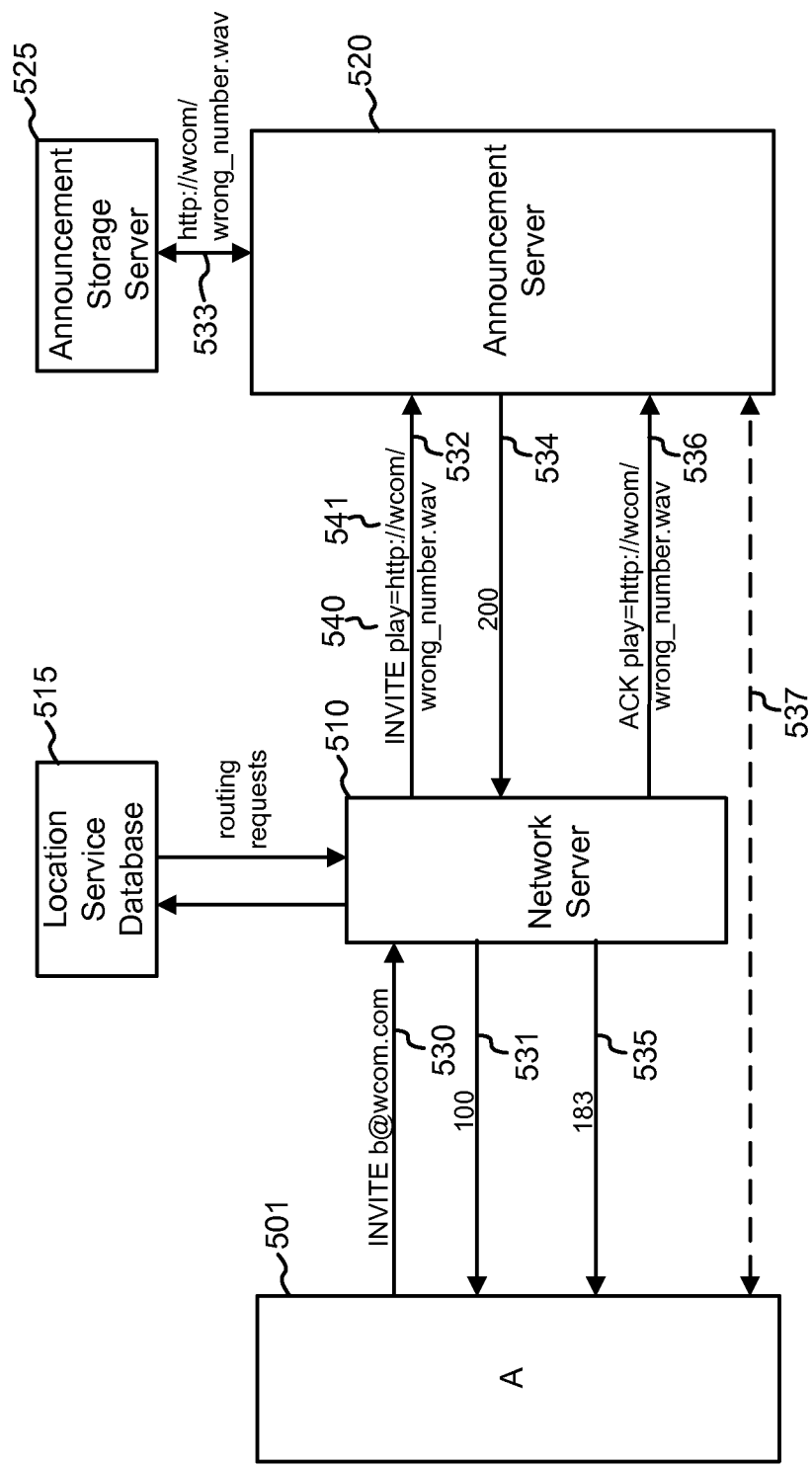
FIG. 5 is a diagram illustrating the playing of a pre-recorded announcement to an end-user station in a SIP network.

In certain situations, it may be desirable for a SIP server, such as proxy server 310, to initiate playback of a pre-recorded announcement to an end-user, such as the user at end-user station 301. In other implementations, the "pre-recorded" announcement may be automatically generated by, for example, computer-implemented text-to-speech processing. As an example of a possible announcement, assume that the address of the party that end-user station 301 attempts to call is not valid, in which case SIP server 310 may direct that a pre-recorded message informing end-user station 301 that the called address is incorrect may be played. FIG. 5 is a diagram illustrating the playing of a pre-recorded message to an end-user station 501 in a SIP network.

In FIG. 5, end-user station 501 may correspond to any of the end-user stations 110 shown in FIG. 1. Network server 510 may correspond to a SIP server, such as a proxy server. Announcement server 520 may be a SIP server dedicated to forming SIP connections that transmit pre-recorded announcements. Announcement storage server 525 may correspond to a database or server that stores and forwards the pre-recorded messages to announcement server 520.

End-user station 501 (user "A") begins by sending an INVITE message 530 to the intended callee (illustrated as "b@wcom.com"). Network server 510 is in the signaling path of the INVITE message, and intercepts the INVITE message. Network server 510 responds with the SIP response code "100," which indicates that the network server 510 is trying to locate the callee (message 531). Network server 510 may submit routing requests to location server database 515 in an attempt to locate the current address of the callee. In this example, assume that network server 510 is unable to locate the current address of the callee and therefore decides to play a pre-recorded announcement to user A, such as an announcement informing user A that the address b@wcom.com is not recognized.

Network server 510 sends an INVITE message 532 to announcement server 520. INVITE message 532 may include an indication of the pre-recorded announcement that is to be played to user A. As shown, this indication is embodied as a "play" tag 540 that includes a reference 541 ("http://wcom/wrong_number.wav") to the resource that contains the announcement. Reference 541 may be structured as a hypertext transfer protocol (HTTP) link. Announcement server 520 retrieves the referenced announcement. The announcement may be retrieved, for example, from a network storage device such as announcement storage server 525 (signal 533). In other implementations, the announcement may be stored locally to announcement server 520.

After successfully retrieving the announcement, announcement server 520 may send a response code 200 (OK) back to network server 510 (message 534). Proxy server 510 may then send a response code, such as response code 183, which is an informational response code that indicates the a session is in progress, back to user A (message 535). Additionally, network server 510 may send an ACK message to announcement server 520 (message 536). Network server 510 and end-user station 501 may further exchange a final response and an ACK message that ends the session between network server 510 and end-user station 501 (not shown). At this point, announcement server 520 and end-user station 501 form a direct connection and begin real-time transmission and reception of the pre-recorded announcement (link 537)

Consistent with an aspect of the invention, reference 541 may correspond to a script that includes multiple instructions for announcement server 520. In general, a script is a sequence of instructions that are interpreted or carried out by another program rather than by a computer processor (as a compiler program is). The instructions in the script may, for example, identify that a sequence of multiple announcements is to be played in a specified order for specified time periods.

An example of a generic set of commands that may be implemented by a script that may be substituted for reference 541 is as follows:

1. Play a filler announcement/music (first announcement) for X seconds.
2. When X seconds has elapsed, play a second announcement (e.g., a "still trying" announcement).
3. When the second announcement is complete, continue with the filler announcement from the point it was interrupted by the second announcement.
4. Go to step (2).

In this example, the value X and an identification of the first announcement and the second announcement would be specifically identified in the actual programming script.

FIG. 6 is a diagram illustrating an exemplary script 600 that performs steps (1)-(4), above. The first line, line 601, of script 600, instructs the announcement server 520 to play a file ("filler.wav") for 10 seconds. After 10 seconds, the announcement server 520 plays the audio file "still_trying.wav" (line 602). Line 603 instructs the announcement server 520 to indefinitely repeat lines 601 and 602.

The script sequence shown in FIG. 6 may be executed by announcement server 520 until network server 510 interrupts the announcement by transmitting a SIP BYE, CANCEL, or Re-INVITE message to announcement server 520.

One of ordinary skill in the art will recognize that the script syntax shown in FIG. 6 is exemplary only. In practice, any set of programming semantics and syntax that allows multiple announcements to be specified, sequenced, and played may be used. In some implementations, the script may additionally include semantic provisions that allow control information, such as duration information (see line 601) and repetition information (see line 603) to be included in a script file.

Exemplary Successful Call Including Announcement Messages

Figure 7B:
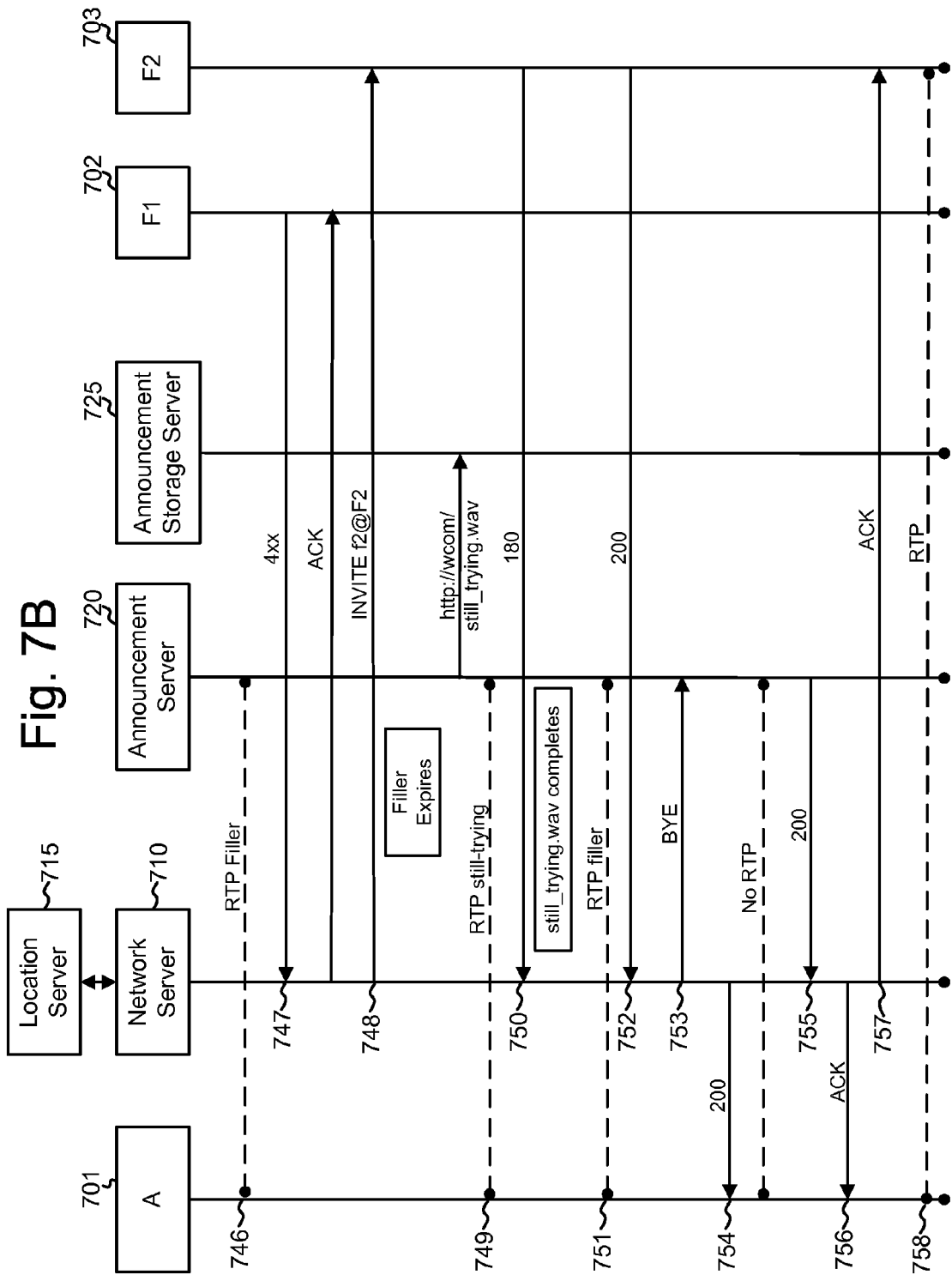

FIGS. 7A and 7B are call flow diagrams illustrating an exemplary successful call setup that includes announcement messages played to the user in a manner consistent with aspects of the present invention. In the call shown in FIGS. 7A and 7B, an end-user station 701 (user "A") attempts to place a call with an end-user "B". It should be understood that end-user stations 701 and 702 may correspond to end-user stations 110 in FIG. 1. User B has customized her personal profile so that the telecommunications system first tries to contact user B at station 702 (labeled as station "F1"), and then, if user B is not available at station 702, at station 703 (labeled as station "F2"). The telecommunications network additionally includes a network server 710, location server 715, announcement server 720, and an announcement storage server 725, implemented in a manner similar to network server 510, location service database 515, announcement server 520, and announcement storage server 525, respectively. Network server 710 may be one server, such as a SIP proxy server, or a combination of local or distributed SIP servers.

The actions relating to a call-setup in FIGS. 7A and 7B are illustrated in a manner similar to the actions shown in FIGS. 3 and 5. However, because of the greater number of messages shown in FIGS. 7A and 7B, devices 701, 702, 703, 710, 715, and 720 are shown as smaller blocks at the top of FIGS. 7A and 7B, with vertical lines extending downward that represent these devices.

The call begins in a manner similar to the call shown in FIG. 5. In particular, end-user station 701 begins by sending an INVITE message (message 730) to the intended callee (illustrated as "b@wcom.com") through network server 710. Network server 710 responds with the SIP response code "100," which indicates that the network server 710 is trying to locate the callee. Network server 710 may submit routing requests to location server 715 in an attempt to locate the current address of the callee. Network server 710 sends an INVITE message (message 732) to announcement server 720. INVITE message 733 includes an indication of the announcement(s) to play as "play" tag 760 and script 761. Script 761 may include multiple instructions for announcement server 720, as previously described with reference to FIG. 6. In this example, however, script 761 merely includes a reference to play the single audio file "greeting.wav".

Announcement server 720 retrieves the announcement(s) referenced in script 761 (message 733). The announcement(s) may be retrieved, for example, from announcement storage server 725. In other implementations, the announcement may be stored locally to announcement server 720. After successfully retrieving the announcement, announcement server 720 may send a response code 200 (OK) back to network server 710 (message 734). Network server 710 may then send response code 183 back to end-user station 701 (message 735). Additionally, network server 710 may send an ACK message to announcement server 720 (message 736). At this point, announcement server 720 and end-user station 701 form a direct connection and begin real-time transmission and reception of the pre-recorded announcement referenced in script 761 (connection 737). The real-time communication session is shown in FIG. 7A as the dashed line "RTP." The announcements may be an initial greeting that is played to user A.

Announcement server 720 signals the end of playback of the pre-recorded greeting to network server 710 with the SIP BYE message (message 738). In other implementations, other SIP messages, such as Re-INVITE may be used to end playback of an announcement. Network server 710 may respond to BYE message 738 via response code 200 (message 739). At this point, the announcement being transmitted between end-user station 701 and announcement server 720 is terminated (link 740).

Network server 710 may next begin to contact user B at station 702. While contacting station 702, network server may direct that a "trying to contact callee" announcement be played to user A. Network server 710 initiates the "trying to contact callee" announcement through INVITE message 741, which is sent to announcement server 720. INVITE message 741 includes script 763 that describes the announcement to play and the manner in which the announcement is to be played. In this example, assume that script 763 is identical to script 600 (FIG. 6). Thus, as previously discussed, script 600 indicates that the announcement "filler.wav" and the announcement "still_trying.wav" are to be played in sequence and repeated indefinitely until interrupted.

As well as sending INVITE message 741, network server 710 may transmit an INVITE message, such as INVITE message 742, to station 702. Station 702 may be the primary station listed for user B in the request returned from location server 715. Concurrently, announcement server 720 may retrieve the first announcement that is specified in INVITE message 741 ("filler.wav") from announcement storage server 725, and begin transmission of this announcement with user A (messages 743-745). The real-time transmission of the "filler" announcement between end-user station 701 and announcement server 720 is shown as connection 746 (FIG. 7B).

Assume that end-user station 702 eventually returns a response code in the 400's (message 747), which indicates that the recipient can not be reached. Network server 710 acknowledges message 747 and transmits INVITE message 748 to station 703, which may be the secondary station listed for user B in the request returned from location server 715. At this point, the original "filler" announcement may finish (i.e., 10 seconds have elapsed). In response, as directed by script 763, announcement server 720 retrieves the "still trying" filler from announcement storage server 725, and begins sending this new announcement in place of the "filler" announcement (connection 749).

Station 703 may transmit a status message, such as response code 180 (ringing) (message 750). At this point, the "still trying" announcement may finish. Because script 763 indicated that the "filler" and "still trying" announcements were to be repeated indefinitely, announcement server 720 returns to transmitting the "filler" announcement (connection 751).

At some point, station 703 may transmit a response code 200, indicating that station 703 will accept the call (message 752). Network server 710 may then end announcement playback via BYE message 753 and forward the response code 200 to user A (message 754). User A and B are then connected for a SIP conversation via messages 755-757. In message 755, announcement server 720 responds to the BYE message 753. In message 756, end-user station 701 receives an acknowledgement of the successful connection and in message 757, network server 710 acknowledges that network server 710 received message 756 and user A is ready to engage in the call. At this point, the real-time SIP call can be set-up directly between end-user stations 701 and 703 (connection 758).

Exemplary Failed Call Including Announcement Messages

FIGS. 8A and 8B are call flow diagrams illustrating an exemplary failed call setup that includes announcement messages played to the user in a manner consistent with aspects of the present invention. Certain portions of the description relating to FIGS. 8A and 8B are similar to that of FIGS. 7A and 7B. In the call setup shown in FIGS. 8A and 8B, end-user station 701 (user "A") attempts to place a call with an end-user "B" in a manner similar to the call setup shown in FIGS. 7A and 7B.

More specifically, as shown in FIG. 8, messages 830-851 are transmitted between end-user station 701, end-user station 702, end-user station 703, network server 710, announcement server 720, and announcement storage server 725 in an attempt to perform the call set-up illustrated in FIG. 7. Messages 830-851 are identical to the corresponding messages 730-751. In the example of FIG. 8B, however, end-user station 703 returns a response code 486 (message 852), which indicates that end-user station 703 could not be reached. Network server 710 acknowledges message 852 (message 853).

At this point, network server 710 does not have any further addresses at which user B may reside, and thus decides to return a "busy" announcement to user A. Network server 710 transmits INVITE message 854 to announcement server 720. INVITE message 854 includes a reference 865 to an audio file that contains a busy signal announcement. After successfully retrieving this announcement, from, for example, announcement storage server 725, announcement server 720 may send a response code 200 (OK) back to network server 710 (message 855). Network server 710 may then send response code 183 back to end-user station 701 (message 856). End-user station 701 and announcement server 720 may then exchange the busy signal announcement with one another (connection 857).

Network server 710 acknowledges message 855 (message 858), and when the busy signal announcement completes, announcement server 720 sends BYE message 859 to network server 710. Network server 710 sends a response code 200 back to announcement server 710. Network server 710 and end-user station 701 may further exchange a final response and an ACK message to end their session (not shown).

CONCLUSION

As described above, network servers in a SIP telecommunication network efficiently allow for announcements to be played back to users of the network. SIP messages may include scripts that can define sophisticated playback sequences for the pre-recorded announcements.

Further, although the present invention is discussed in the context of the Session Initiation Protocol (SIP) and an Internet Protocol (IP)-based network, one of ordinary skill in the art will recognize that the present invention may be generally applicable to other equivalent or analogous communication protocols or communications networks.

The foregoing description of preferred embodiments of the invention provides illustration and description, but is not intended to be exhaustive or to limit the invention to the precise form disclosed. Modifications and variations are possible in light of the above teachings or may be acquired from practice of the invention. Moreover, while a series of acts have been presented with respect to FIG. 4, the order of the acts may be different in other implementations consistent with the present invention.

Certain portions of the invention have been described as software that performs one or more functions. The software may more generally be implemented as any type of logic. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed: message to an announcement server.

1. A method performed by a server device, the method comprising:
    embedding, with the server device, a script file into a session initiation protocol (SIP) message, the script file defining a sequence of a plurality of audio announcements; and
    transmitting, with the server device, the SIP message to an announcement server.

2. The method of claim 1, wherein the SIP message comprises a SIP INVITE message.

3. The method of claim 1, wherein the script file comprises control information relating to transmission of the plurality of audio announcements.

4. The method of claim 3, wherein the control information comprises duration information that defines a time period for playback of the plurality of audio announcements.

5. The method of claim 3, wherein the control information defines a repetition cycle of the plurality of audio announcements.

6. The method of claim 1, wherein the script file comprises identification information relating to storage locations for the plurality of audio announcements.

7. An apparatus comprising:
    a server device configured to:
    embed, into a session initiation protocol (SIP) message, a reference to at least one pre-recorded announcement to playback, and
    transmit the SIP message to an announcement server device.

8. The apparatus of claim 7, wherein the SIP message comprises a SIP INVITE message.

9. The apparatus of claim 7, wherein the server device is further configured to:
    embed, into the SIP message, duration information that defines a duration of playback of the at least one pre-recorded announcement.

10. The apparatus of claim 7, wherein the server device is further configured to:
    embed, into the SIP message, information that defines a repetition cycle of the at least one pre-recorded announcement.

11. A method comprising:
    receiving, by a server device, a session initiation protocol (SIP) message that includes a script file, the script file defining a playback sequence for a plurality of announcements;
    retrieving, by the server device, the plurality of announcements; and
    transmitting, by the server device, the plurality of announcements to an end user station associated with the SIP message, the plurality of announcements being transmitted to the end user station based on the defined playback sequence.

12. The method of claim 11, wherein the SIP message comprises a SIP INVITE message.

13. The method of claim 11, wherein the script file comprises duration information relating to the playback of the plurality of announcements, and
    wherein transmitting the plurality of announcements comprises transmitting the plurality of announcements based on the duration information.

14. The method of claim 11, wherein the script file comprises information identifying a repetition cycle relating to the playback of the plurality of announcements, and
    wherein transmitting the plurality of announcements comprises transmitting the plurality of announcements based on the repetition cycle.

15. The method of claim 11, wherein the script file comprises identification information relating to storage locations for the plurality of announcements, and
    wherein retrieving the plurality of announcements comprises accessing the identified storage locations.

16. A non-transitory computer readable medium having instructions-stored thereon that in response to being executed by a computing device, cause the computing device to perform operations, the operations comprising:
    receiving a session initiation protocol (SIP) message that includes a hyperlink to at least one pre-recorded announcement to playback;

accessing the hyperlink to retrieve the at least one pre-recorded announcement; and transmitting the at least one pre-recorded announcement to an end user station that is associated with the SIP message.

17. The non-transitory computer readable medium of claim 16, wherein transmitting the at least one pre-recorded announcement to the end user station comprises transmitting the at least one pre-recorded announcement to the end user station in a real-time communication session.

18. The non-transitory computer readable medium of claim 16, wherein the SIP message comprises a SIP INVITE message.

19. The non-transitory computer readable medium of claim 16, wherein:

the SIP message comprises duration information relating to the playback of the at least one pre-recorded announcement, and transmitting the at least one pre-recorded announcement comprises transmitting the at least one pre-recorded announcement based on the duration information.

20. The non-transitory computer readable computer readable medium of claim 16, wherein:

the SIP message comprises information identifying a repetition cycle relating to the playback of the at least one pre-recorded announcement, and transmitting the at least one pre-recorded announcement comprises transmitting the at least one pre-recorded announcement based on the repetition cycle.

21. The apparatus of claim 7, wherein the server device configured to embed the reference to the at least one pre-recorded announcement to playback comprises the server device configured to embed, into the session initiation protocol (SIP) message, a hyperlink to the at least one pre-recorded announcement to playback.

22. An apparatus comprising:

a server device configured to:

embed a script file into a session initiation protocol (SIP) message, the script file defining a sequence of a plurality of audio announcements; and transmit the SIP message to an announcement server.

23. The apparatus of claim 22, wherein the SIP message comprises a SIP INVITE message.

24. The apparatus of claim 22, wherein the script file comprises control information relating to transmission of the plurality of audio announcements.

25. The apparatus of claim 24, wherein the control information comprises duration information that defines a time period for playback of the plurality of audio announcements.

26. The apparatus of claim 24, wherein the control information defines a repetition cycle of the plurality of audio announcements.

27. The apparatus of claim 22, wherein the script file comprises identification information relating to storage locations for the plurality of audio announcements.

28. A non-transitory computer readable medium having instructions stored thereon that, in response to execution by a computing device, cause the computing device to perform operations, the operations comprising:

embedding, with a server device, a script file into a session initiation protocol (SIP) message, the script file defining a sequence of a plurality of audio announcements; and transmitting, with the server device, the SIP message to an announcement server.

29. The non-transitory computer readable medium of claim 28, wherein the SIP message comprises a SIP INVITE message.

30. The non-transitory computer readable medium of claim 28, wherein the script file comprises control information relating to transmission of the plurality of audio announcements.

31. The non-transitory computer readable medium of claim 30, wherein the control information comprises duration information that defines a time period for playback of the plurality of audio announcements.

32. The non-transitory computer readable medium of claim 30, wherein the control information defines a repetition cycle of the plurality of audio announcements.

33. The non-transitory computer readable medium of claim 28, wherein the script file comprises identification information relating to storage locations for the plurality of audio announcements.

34. A method comprising:

embedding into a session initiation protocol (SIP) message, with a server device, a reference to at least one pre-recorded announcement to playback, and transmitting, with the server device, the SIP message to an announcement server device.

35. The method of claim 34, wherein the SIP message comprises a SIP INVITE message.

36. The method of claim 34, further comprising embedding into the SIP message, with the server device, duration information that defines a duration of playback of the at least one pre-recorded announcement.

37. The method of claim 34, further comprising embedding into the SIP message, with the server device, information that defines a repetition cycle of the at least one pre-recorded announcement.

38. The method of claim 34, wherein embedding the reference to the at least one pre-recorded announcement to playback comprises embedding into the session initiation protocol (SIP) message, with the server device, a hyperlink to the at least one pre-recorded announcement to playback.

39. A non-transitory computer readable medium having instructions stored thereon that, in response to execution by a computing device, cause the computing device to perform operations, the operations comprising:

embedding into a session initiation protocol (SIP) message, with a server device, a reference to at least one pre-recorded announcement to playback, and transmitting, with the server device, the SIP message to an announcement server device.

40. The non-transitory computer readable medium of claim 39, wherein the SIP message comprises a SIP INVITE message.

41. The non-transitory computer readable medium of claim 39, further comprising embedding into the SIP message, with the server device, duration information that defines a duration of playback of the at least one pre-recorded announcement.

42. The non-transitory computer readable medium of claim 39, further comprising embedding into the SIP message, with the server device, information that defines a repetition cycle of the at least one pre-recorded announcement.

43. The non-transitory computer readable medium of claim 39, wherein embedding the reference to the at least one pre-recorded announcement to playback comprises embedding into the session initiation protocol (SIP) message, with the server device, a hyperlink to the at least one pre-recorded announcement to playback.

44. A non-transitory computer readable medium having instructions stored thereon that, in response to execution by a computing device, cause the computing device to perform operations, the operations comprising:

receiving, by a server device, a session initiation protocol (SIP) message that includes a script file, the script filing defining a playback sequence for a plurality of announcements;

retrieving, by the server device, the plurality of announcements; and transmitting, by the server device, the plurality of announcements to an end user station associated with the SIP message, the plurality of announcements being transmitted to the end user station based on the defined playback sequence.

45. The non-transitory computer readable medium of claim 44, wherein the SIP message comprises a SIP INVITE message.

46. The non-transitory computer readable medium of claim 44, wherein the script file comprises duration information relating to the playback of the plurality of announcements, and wherein transmitting the plurality of announcements comprises transmitting the plurality of announcements based on the duration information.

47. The non-transitory computer readable medium of claim 44, wherein the script file comprises information identifying a repetition cycle relating to the playback of the plurality of announcements, and wherein transmitting the plurality of announcements comprises transmitting the plurality of announcements based on the repetition cycle.

48. The non-transitory computer readable medium of claim 44, wherein the script file comprises identification information relating to storage locations for the plurality of announcements, and wherein retrieving the plurality of announcements comprises accessing the identified storage locations.

49. An apparatus comprising:

a server device configured to receive a session initiation protocol (SIP) message that includes a script file, the script file defining a playback sequence for a plurality of announcements;

retrieve the plurality of announcements; and transmit the plurality of announcements to an end user station associated with the SIP message, the plurality of announcements being transmitted to the end user station based on the defined playback sequence.

50. The apparatus of claim 49, wherein the SIP message comprises a SIP INVITE message.

51. The apparatus of claim 49, wherein the script file comprises duration information relating to the playback of the plurality of announcements, and wherein the server device configured to transmit the plurality of announcements comprises the server device configured to transmit the plurality of announcements based on the duration information.

52. The apparatus of claim 49, wherein the script file comprises information identifying a repetition cycle relating to the playback of the plurality of announcements, and wherein the server device configured to transmit the plurality of announcements comprises the server device configured to transmit the plurality of announcements based on the repetition cycle.

53. The apparatus of claim 49, wherein the script file comprises identification information relating to storage locations for the plurality of announcements, and wherein the server device configured to retrieve the plurality of announcements comprises the server device configured to access the identified storage locations.

54. A method comprising:

receiving a session initiation protocol (SIP) message that includes a hyperlink to at least one pre-recorded announcement to playback;

accessing the hyperlink to retrieve the at least one prerecorded announcement; and transmitting the at least one pre-recorded announcement to an end user station that is associated with the SIP message.

55. The method of claim 54, wherein transmitting the at least one pre-recorded announcement to the end user station comprises transmitting the at least one pre-recorded announcement to the end user station in a real-time communication session.

56. The method of claim 54, wherein the SIP message comprises a SIP INVITE message.

57. The method of claim 54, wherein:

the SIP message comprises duration information relating to the playback of the at least one pre-recorded announcement, and transmitting the at least one pre-recorded announcement comprises transmitting the at least one pre-recorded announcement based on the duration information.

58. The method of claim 54, wherein:

the SIP message comprises information identifying a repetition cycle relating to the playback of the at least one pre-recorded announcement, and transmitting the at least one pre-recorded announcement comprises transmitting the at least one pre-recorded announcement based on the repetition cycle.

59. An apparatus comprising:

a server device configured to:

receive a session initiation protocol (SIP) message that includes a hyperlink to at least one pre-recorded announcement to playback;

access the hyperlink to retrieve the at least one prerecorded announcement; and transmit the at least one pre-recorded announcement to an end user station that is associated with the SIP message.

60. The apparatus of claim 59, wherein the server device configured to transmit the at least one pre-recorded announcement to the end user station comprises the server configured to transmit the at least one pre-recorded announcement to the end user station in a real-time communication session.

61. The apparatus of claim 59, wherein the SIP message comprises a SIP INVITE message.

62. The apparatus of claim 59, wherein:

the SIP message comprises duration information relating to the playback of the at least one pre-recorded announcement, and the server device configured to transmit the at least one pre-recorded announcement comprises the server device configured to transmit the at least one pre-recorded announcement based on the duration information.

63. The apparatus of claim 59, wherein:

the SIP message comprises information identifying a repetition cycle relating to the playback of the at least one pre-recorded announcement, and the server device configured to transmit the at least one pre-recorded announcement comprises the server device configured to transmit the at least one pre-recorded announcement based on the repetition cycle.

\* \* \* \* \*